United States Patent

[11] 3,571,687

| [72] | Inventor | Arthur F. Larwin |
| | | Grand Rapids, Mich. |
| [21] | Appl. No. | 761,244 |
| [22] | Filed | Sept. 20, 1968 |
| [45] | Patented | Mar. 23, 1971 |
| [73] | Assignee | Lear Siegler, Inc. |

[54] METHOD AND APPARATUS FOR PROVIDING ERROR COMPENSATION IN A DATA TRANSMISSION SYSTEM
14 Claims, 1 Drawing Fig.

[52] U.S. Cl. .................................................. 318/632,
                                                          318/633
[51] Int. Cl. ................................................. G05b 13/02
[50] Field of Search ........................................ 318/20.530,
                                                          20.535

[56] References Cited
UNITED STATES PATENTS

| 2,796,568 | 6/1957 | Gray ........................... | 318/30 |
| 2,974,264 | 3/1961 | Depp .......................... | 318/30 |
| 3,031,766 | 5/1962 | Schulte ....................... | 318/30X |
| 3,139,572 | 6/1964 | Evans ......................... | 318/28X |
| 3,422,325 | 11/1969 | Gerber et al. ................ | 318/30X |

*Primary Examiner*—Benjamin Dobeck
*Attorneys*—Wilfred O. Schmidt and Robert J. Carrier

ABSTRACT: In a magnetic azimuth detector system employing a servo transmission network between the input and a remote readout, error correction is provided by inserting correction signals into the servo transmission system. The servo transmission system employs a control transformer having null and 90° output windings and error compensation is effected by summing index, one cycle and two cycle error correction signals with the signal across the null output winding.

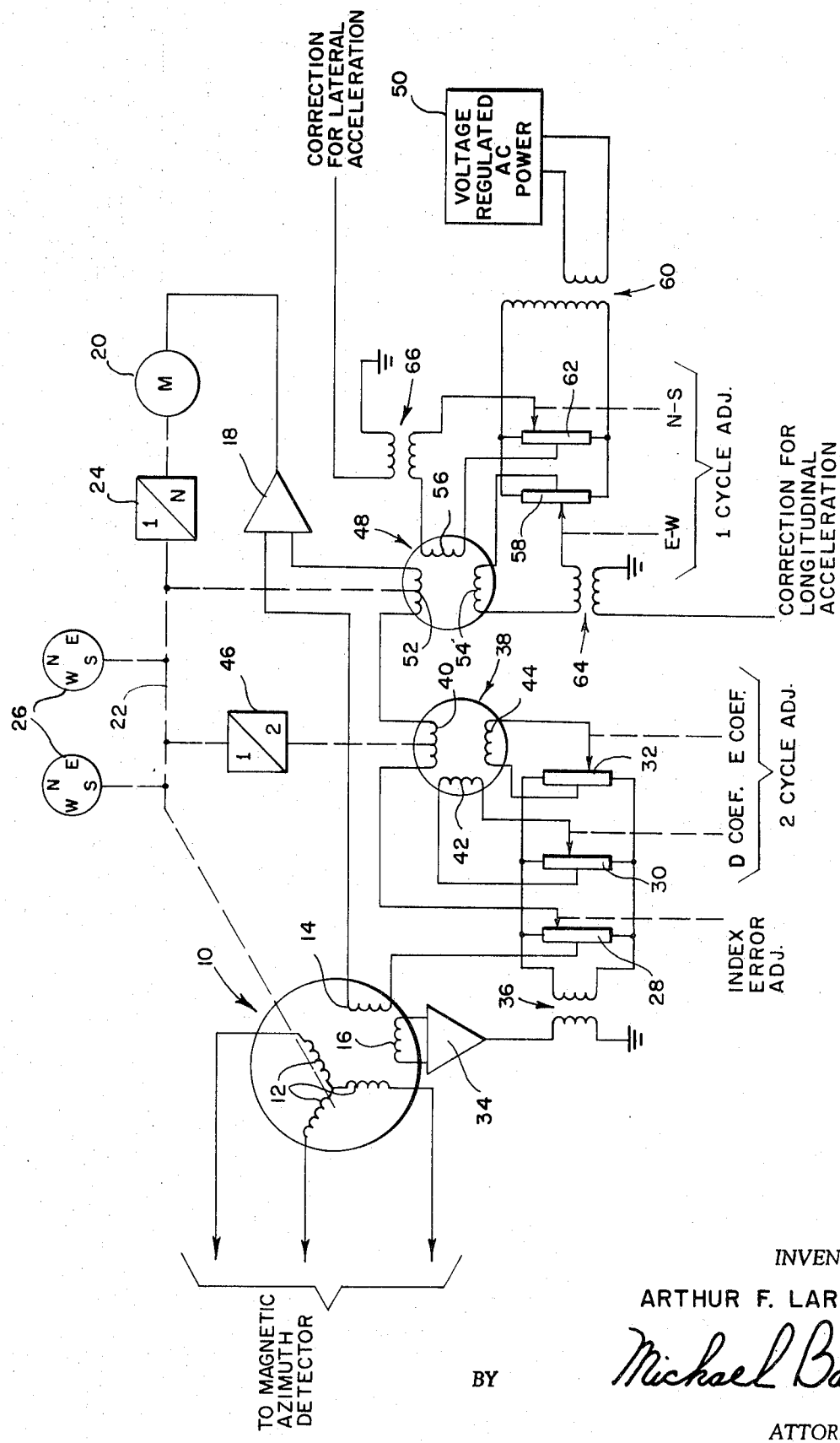

METHOD AND APPARATUS FOR PROVIDING ERROR COMPENSATION IN A DATA TRANSMISSION SYSTEM

BACKGROUND OF THE INVENTION

This invention relates to error compensation in data transmission systems and more particularly is concerned with correction of heading errors in magnetic azimuth detector systems.

The need for heading error compensation in magnetic azimuth detector (MAD) systems is well known. Pendulously mounted flux valves, magnetic azimuth detectors, are widely employed in aircraft navigation systems as a direction reference but are subject to errors caused, for example, by extraneous magnetic fields such as those produced within or by the aircraft, unequal impedances in transmission lines, accelerations of the aircraft, and misalignment of the flux valve with the aircraft axis. In one type of prior compensating system DC currents are injected into the flux valve windings. Such a system is susceptible to noise problems, because of the need for breaking into the leads to the flux valve, for injection of the compensating signal, and requires great care to avoid unduly loading the flux valve. Moreover, the compensation must be tailored to a particular flux valve, which limits interchangeability of components. Other prior compensation systems which require connection to the flux valve itself are subject to similar disadvantages.

In still another type of prior compensation scheme, compensating signals produced by a rotary master potentiometer or by a complex rotary error compensation signal generator are injected into a repeater servosystem which connects the flux valve receiver to a remote indicator. While this type of compensation avoids some of the problems of the aforementioned types, it suffers from complexity inherent in the requirement of a large bank of individual potentiometers which are employed in conjunction with the master potentiometer to produce a straightline approximation of the compensation curve, or in the requirement of a complex and expensive error compensation signal generator having a multiplicity of adjustments. Moreover, such compensation schemes proposed heretofore have been deficient in failing to provide one or more of the several types of compensating signals required for complete compensation.

BRIEF SUMMARY OF THE INVENTION

It is accordingly a principal object of the invention to provide an improved apparatus for and method of error compensation in a data transmission system.

More specifically, it is an object of the invention to provide improved and greatly simplified apparatus and method for compensating for index, one cycle, two cycle, Coriolis, and longitudinal and lateral acceleration errors in magnetic azimuth detector systems.

Briefly stated, the present invention provides error compensation in a magnetic azimuth detector system by injecting correction signals into a servosystem that transmits the signal from the MAD to a remote readout. The invention employs synchro resolvers having output windings the signals across which are summed with those across the null winding of a control transformer and having input windings supplied from appropriate sources and adjusted in accordance with the type of error to be corrected. Index error compensation is provided by a potentiometer supply signal summed directly with that of the null winding of the control transformer.

BRIEF DESCRIPTION OF THE DRAWING

The single FIG. of the drawing is a schematic diagram illustrating the compensation apparatus of the invention incorporated in a magnetic azimuth detector system.

DETAILED DESCRIPTION OF THE INVENTION

As an introduction to the detailed description of the invention, the types and causes of heading error will first be analyzed.

The types and sources of error to which aircraft magnetic azimuth detection (MAD) systems are susceptible may be briefly summarized as follows:

| Error Type | Source or cause |
|---|---|
| Index | MAD installation and design error. |
| One (1) cycle | Hard iron in aircraft. |
| Two (2) cycle | Soft iron in aircraft, transmission lines from MAD and synchro errors. |
| Acceleration | Vertical error in MAD element due to lateral and longitudinal accelerations of aircraft. |
| Coriolis | Vertical error in MAD element due to Coriolis acceleration. |

Index error is a constant offset error that does not change with field strength.

The one cycle error in an aircraft MAD is due to the shift in the direction of the total magnetic field vector (vector sum of earth's field and hard iron field) as a result of the rotation of the hard iron field of the aircraft as the aircraft is turned in azimuth. This error varies inversely with changes in the strength of the earth's field. It is termed "one cycle" because the error is a function which has a cycle corresponding to the one cycle variation of heading through 360°. The change $\Theta$ in the total field direction as a result of the hard iron field is given by the following equation:

$$\theta = \tan^{-1} \frac{\sin \Psi}{\frac{E_h}{I} + \cos \Psi}$$

Where:
$I$ = hard iron field
$E_h$ = earth's horizontal field
$\Psi$ = angle between $I$ and $E_h$ The error is thus seen to be a function of the magnitude of $E_h$ and $I$ and of the heading of the aircraft and approximately of sine wave shape for low values of $I$. In accordance with the invention a true sine wave compensating signal is employed for one cycle compensation.

The two cycle error (error having two cycles for each cycle of heading variation through 360°) is the vector sum of the following errors:

| Error source: | Magnitude (Normally), degrees |
|---|---|
| Soft iron | 0–.5 |
| Synchro tracking | 0–.25 |
| MAD transmission lines | 0–.5 |

Soft iron (two (2) cycle) error may be represented by the following equation:

$$\Psi e = \tan^{-1} \frac{K \cos \theta \sin \theta}{1 + K \cos \theta \sin \theta}$$

Where:
$\psi e$ = soft iron heading error
$\Theta$ = angle between the soft iron field and the earth's field
$K$ = ratio of induced soft iron field to the in-line component of the inducing field.

For low values of $K$, this equation becomes:

$$\Psi e \cong \tan^{-1} \frac{K}{2} \sin 2\theta$$

Examination of the complete equation for soft iron heading error shows that for an induced field of 3.5 percent of the inducing field ($K = 0.035$), the heading error follows a two cycle sine wave of 59' amplitude within 1'. Therefore, a two cycle sine wave will correct for the soft iron error.

The major portion of the synchro tracking error is two cycle in nature and can be corrected with a two cycle correction function.

Transmission line error is caused by mismatched impedances between the stator legs of the MAD transmitter and receiver. It can be shown that the error equation is essentially the same as the equation for soft iron error, and thus the error can be corrected by two cycle sine wave correction.

Errors caused by lateral and longitudinal acceleration of the aircraft result from tipping of the MAD element such that it picks up a portion of the earth's vertical field. The error caused by a lateral acceleration can be represented by the following equation:

$$\Psi e = \tan^{-1} \frac{\cos \Psi m}{\frac{E_h g}{E_v A_{\text{Lat}}} + \sin \Psi m}$$

and the error caused by longitudinal acceleration can be represented by the following equation:

$$\Psi e = \tan^{-1} \frac{\sin \Psi m}{\frac{E_h g}{E_v A_{\text{Long}}} + \cos \Psi m}$$

Where:

$\Psi e$ = magnetic heading error
$\Psi m$ = magnetic heading
$E_h$ = Earth's horizontal field strength
$E_v$ = Earth's vertical field strength
$A_{\text{Lat}}$ = Lateral acceleration of aircraft
$A_{\text{Long}}$ = Longitudinal Acceleration of aircraft
$g$ = acceleration of gravity.

It will be observed that these equations are similar to the equation for one cycle error, and indeed lateral and longitudinal accelerations do cause a one cycle error. The distinction is that the equations for longitudinal and lateral acceleration describe an error curve with a definite position with respect to magnetic heading, whereas the hard iron error has a random position depending upon the direction of the hard iron.

It can be shown that Coriolis error is also essentially a one cycle error caused by the lateral acceleration commonly known as Coriolis.

The manner in which the foregoing errors are compensated in accordance with the invention will now be described in conjunction with the drawing, wherein the compensating circuits are incorporated in a MAD servo transmission system. The servo transmission system comprises a conventional synchro control transformer 10, having three-phase Y-connected primary windings 12 respectively connected to the corresponding windings of the MAD or flux valve (not shown). The synchro receiver 10 has two secondary or output winding—a null winding 14 and a 90° winding 16 (so termed because it is spatially positioned 90° relative to the null winding). Either the primary windings 12 or the secondary windings 14 and 16 may be the rotor or the stator, and in the form shown the primary windings 12 comprise the rotor. In addition to the control transformer 10 the servo transmission system includes a servoamplifier 18 (including preamplifier, demodulator, windings—a etc. not shown) and a servomotor 20 (such as a two-phase reversible motor) which drives an output shaft 22 through a suitable gear train 24 having an output to input ratio of 1/N. Shaft 22 drives one or more readout devices 26, such as compass cards, and also drives the rotor 12 of the control transformer 10.

In accordance with the invention, errors in the MAD system are corrected by injecting signals into the null winding circuit of the synchro receiver 10 in series fashion as shown (or summed in parallel in amplifier 18). The signals drive the servo off the control transformer null by an amount directly proportional to the injected signals. In the form shown three potentiometers 28, 30, and 32 are supplied with AC potentials from the 90° winding 16, the output of which may be amplified by an amplifier 34 and applied by a transformer 36 across the ends of the potentiometer windings. The potentiometers may be center-tapped and provided with conventional sliders as indicated. The center tap of potentiometer 28 is connected to one end of null winding 14, and the other end of the null winding is connected to one of the input terminals of the servoamplifier 18. The other input terminal of the servoamplifier 18 is connected to the slider of potentiometer 28 (through circuitry to be described hereinafter), so that the potential tapped off by the slider of potentiometer 28 is summed with the output of the null winding 14 of the control transformer. As will appear more fully hereinafter, the slider of potentiometer 28 is adjusted in accordance with the index error to be corrected.

The circuit for injecting two cycle compensating signals into the null winding circuit of the control transformer 10 includes a synchro resolver 38 having a rotatable output (secondary) winding 40 connected to the null winding 14 so as to sum their respective signals and having a pair of input stator (primary or excitation) windings 42 and 44 displaced by 90° from each other. Alternatively windings 42 and 44 may rotate and winding 40 may be stationary. Winding 42 has one end connected to the center tap of potentiometer 30 and has its other end connected to the slider of this potentiometer, while winding 44 has one end connected to the center tap of potentiometer 32 and the other end connected to the slider of this potentiometer. Winding 40 is mechanically driven from the output shaft 22 by a 1 to 2 gear train 46 and hence is driven at twice the rate at which the output devices 26 and synchro windings 12 are driven. As will be described more fully hereinafter, the potentiometers 30 and 32 are adjusted in accordance with coefficients determined by the two cycle heading error.

Even though the index and two cycle errors do not vary with the earth's field strength, the 90° winding 16 of the control transformer (with its field strength varying output) serves as an appropriate source of correction potential supply. This is so because the magnitudes of the outputs of the null winding 14 and the 90° winding 16 both vary in a like manner with the strength of the received signal from the flux valve and there is no net change in their vector sum input to amplifier 18 for a change in field strength.

The magnitude and position (relative to the heading signal) of the correction signal introduced by the resolver 38 are controlled by adjustment of the voltage level and phase of the potentials supplied to the input windings 42 and 44, which are determined by the setting of the sliders of potentiometers 30 and 32 and which in turn determine the magnitude and polarity of the magnetic fields produced by windings 42 and 44. Rotation of the output winding 40 of the resolver at twice the rate of the output shaft 22 generates a two cycle correction signal which is added to the signal from the null winding 14. It should be emphasized that the terms one cycle and two cycle error functions do not refer to a rate or frequency but rather to the cyclical nature of the respective error functions and the number of cycles completed by such respective functions within one complete cycle of the MAD and of course the control transformer rotor 12. The resolver output is a sinusoidal function, the amplitude and phase of which are determined by the vector sum of the magnetic fields produced by windings 42 and 44.

As set forth above, the one cycle error varies inversely with the earth's field strength. Accordingly, one cycle error compensation, which is introduced into the null winding circuit (input to the amplifier 18) by a synchro resolver 48 (like the resolver 38), is supplied from a regulated voltage AC power supply 50, so that as the earth's field strength increases, the relative amount of correction is reduced (and vice versa). This is so because the output signal level at the null winding 14 increases without a corresponding increase in the correction signal at the rotatable output winding 52 of the synchro resolver 48. The winding 52 is connected in series with null winding 14 and is mechanically driven by servo motor 20 at the same rate as the output shaft 22 causing the error signal induced in the winding 52 to be one cycle in nature. Resolver 48 has a pair of input windings 54 and 56 which are displaced from each other by 90° and constitute the stator. In the form shown the winding 54 has its ends connected to the slider and center tap, respectively, of a potentiometer 58, which is connected to the power supply 50 by a transformer 60. Winding 56 has its ends connected to the slider and center tap, respectively, of a potentiometer 62, which is also supplied by transformer 60.

It is thus apparent that winding 54 is supplied with a potential selected by the slider of potentiometer 58, while winding 56 is supplied with a potential selected by the slider of potentiometer 62. As will be set forth hereinafter, the sliders of potentiometers 58 and 62 are set in accordance with one cycle coefficients determined by the one cycle error present in the system. The magnitude and position of the correction signal obtained at winding 52 of resolver 48 are controlled by the voltage level and phase of the potentials supplied to the input windings of the resolver 48 in accordance with the potentiometer adjustments just mentioned.

The longitudinal and lateral acceleration errors are also one cycle and are therefore injected into the one cycle correction circuit feeding resolver 48, by means of AC potentials supplied by transformers 64 and 66, the secondary windings of which are in series with resolver windings 54 and 56, respectively. These errors have a constant relationship to magnetic heading and are therefore injected into specific windings of the resolver. The signal injected into the resolver for correction of longitudinal acceleration is proportional to $$\frac{A_{Long} E_v}{g E_h}$$

For lateral acceleration the correction signal is proportional to $$\frac{A_{Lat} E_v}{g E_h},$$

Where:
- $A_{Long}$ = Longitudinal Acceleration
- $A_{Lat}$ = Lateral Acceleration
- $E_v$ = Earth's vertical magnetic field
- $E_h$ = Earth's horizontal magnetic field
- $g$ = Gravity acceleration where $A_{Lat}$ is considered to include the Coriolis acceleration factor. Devices for generating these correction signals are well known in the art and are not the subject of the present invention.

Potentiometers 28, 30, 32, 58 and 62 are set in accordance with values determined from the actual errors at different headings. As is well known, the errors for different headings may be determined, for example, by ground swinging of the aircraft and comparison of the indicated headings with true headings. The error values may be recorded as follows:

| Heading: | Heading Error (degrees) |
|---|---|
| 0 | a |
| 45 | b |
| 90 | c |
| 135 | d |
| 180 | e |
| 225 | f |
| 270 | g |
| 315 | h |

The setting of the index error potentiometer 28 may be determined from the following equation:

$$\text{Index error} = \frac{a+b+c+d+e+f+g+h}{8}.$$

The two cycle coefficient $D$ for the setting of the potentiometer 30 is given by the equation:

$$D = \frac{b-d+f-h}{4}$$

The coefficient $E$ for adjustment of potentiometer 32 is given by the equation:

$$E = \frac{a-c+e-g}{4}.$$

The North-South coefficient $N\text{-}S$ for adjustment of potentiometer 62 is given by the equation:

$$N-S = \frac{a-e}{2}.$$

The East-West coefficient $E\text{-}W$ for adjustment of potentiometer 58 is given by the equation:

$$E-W = \frac{c-g}{2}.$$

The $D$ and $E$ coefficients thus determine the magnitude and position of the two cycle error excluding the index and one cycle error. The $D$ and $E$ coefficients are two components of the two cycle error spaced 45° in heading, the resultant of which is the total two cycle error. The $D$ and $E$ coefficients are resolved into the total two cycle error vector in resolver 38. The $N\text{-}S$ and $E\text{-}W$ coefficients determine the magnitude and position of the one cycle error excluding the index and two cycle error. The $N\text{-}S$ and $E\text{-}W$ coefficients are two components of the one cycle error spaced 90° in heading, the resultant of which is the total one cycle error. The $N\text{-}S$ and $E\text{-}W$ coefficients are resolved into the total one cycle error vector in resolver 48. The index error is determined excluding the one and two cycle errors.

The invention permits incorporation of the correction system completely within the servo transmission system without injection of signals into the magnetic azimuth detector, thereby avoiding the ill effects of pickup in the MAD leads or loading of the MAD. The complete compensation module may be readily removable from the MAD system. Compensation for all of the error factors is provided, and the invention generally improves reliability, reduces cost, reduces weight, and improves maintainability. Further, it should be noted that while the FIGURE shows the error compensation signals added in series with the control transformer null winding, these compensation signals could also be added in parallel with the control transformer null winding.

Obviously, many modifications and variations of the present invention are possible in the light of the above teachings and it will be readily apparent to those skilled in the art that various changes in form and arrangement of components may be made to suit requirements without departing from the spirit and scope of this invention. Accordingly, it is to be understood that within the scope of the appended claims the present invention may be practiced in a manner otherwise than is specifically described herein.

I claim:
1. In a data transmission system of the type having an input, a remote reading output and a servo transmission network including a receiver having a rotor capable of cycling in response to said input, coupling said input and output, the improvement including:
   means for injecting a first set of error compensating signals having a cyclical function which completes two cycles for each cycle of said rotor into said servo transmission network; and
   means for injecting a second set of error compensating signals having a cyclical function which completes one cycle for each cycle of said rotor into said servo transmission network wherein each of said first set of error compensating signals varies with said input and each of said second set of error compensating signals is independent of variations in said input.
2. The invention as related in claim 1, additionally including:

means for sensing the position of said rotor and generating a signal indicative thereof; and means for summing said first and second sets of error compensating signals with said rotor position indication signal.

3. The invention of claim 2, wherein said first and second sets of error compensating signals injecting means each include: resolver means each having a stator and a rotor with said respective resolver rotors each being coupled to said receiver rotor so as to rotate therewith.

4. The invention as described in claim 3, wherein the resolver rotor of said first set of error compensating signals injecting means is coupled to said receiver rotor so as to rotate at twice the rate thereof and said second set of error compensating signals injecting means is coupled to said receiver rotor so as to rotate synchronously therewith.

5. The invention set forth in claim 4 wherein said receiver rotor position sensing means comprises a stator winding and wherein said receiver includes: a 90° stator winding positioned normally to said position sensing stator winding.

6. The invention as recited in claim 5, wherein a portion of any signal appearing across said 90° stator winding is added to the signal appearing at said position sensing means stator winding to provide further error compensation.

7. The invention set forth in claim 6, wherein the stator of the resolver of said first set of error compensating signals injecting means comprises a pair of windings disposed normally with respect to each other and each coupled to the 90° stator winding of said receiver so as to receive a variable predetermined portion of any signal appearing thereat whereby a cyclical error compensating signal will be resolved by the resolver rotor of said first set of error compensating signals injecting means.

8. The invention as recited in claim 7, wherein said second set of error compensating signals injecting means includes a regulated AC power supply and wherein the stator of the resolver of said second set of error compensating signals injecting means comprises a pair of windings disposed normally with respect to each other and each coupled to said power supply so as to receive a variable predetermined portion of the power output thereof.

9. The invention of claim 8, wherein the resolver rotor of said second set of error compensating signals injecting means will resolve the signals appearing at the stator windings thereof and is operatively connected to said stator position sensing winding and to the resolver rotor of said first set of error compensating signals injecting means, whereby the signals appearing at said resolver rotors will be summed with the signal appearing at the receiver position sensing winding to provide a signal indicative of the deviation of the receiver rotor from a predetermined position.

10. The invention of claim 9, additionally including: means for receiving and detecting said position deviation indication signal and connected to said receiver rotor for causing rotation thereof to said predetermined position in response to such position deviation indication signal.

11. The invention of claim 10, wherein all said cyclical error compensation signals are sinusoidal.

12. In a magnetic azimuth detection system the combination including:

a synchro receiver for receiving signals having a cyclical error and having a rotor and a stator for sensing the position of said rotor and generating signals indicative thereof; and plural means for generating signals indicative of the deviation of said rotor from a predetermined position and summing same with said rotor position indication signals, each of said plural means comprising means for generating a pair of magnetic fields 90° apart, means for adjusting said fields to produce a vector sum field, and means for producing an error correction signal from said sum field with a cycle corresponding to that of said cyclical error signal.

13. The invention set forth in claim 12, further including: means for receiving and detecting said summed rotor position deviation and rotor position signals and connected to said rotor for causing said rotor to seek said predetermined position.

14. In a data transmission system subject to plural errors each of a distinct cyclical nature, the method of compensating for such errors, including the steps of:

generating a plurality of pairs of magnetic fields, the fields within each said pair being 90° apart;

adjusting the fields within each said pair of fields to produce a vector sum field therefor;

inducing a cyclical variation within each said vector sum field corresponding to the cyclical variation within a distinct one of said plural errors; and injecting each of the resultant cyclically varying vector sum fields into the data transmission system to compensate for said plural errors.